Patented Aug. 30, 1949

2,480,465

UNITED STATES PATENT OFFICE 2,480,465

THIOPHENE SULFONIC ACID PREPARATION

Harold S. Halbedel and James C. Heath, Cleveland, Ohio, assignors to The Harshaw Chemical Company, Cleveland, Ohio, a corporation of Ohio No Drawing. Application September 14, 1946, Serial No. 697,161

2 Claims. (Cl. 260—329)

This invention relates to thiophene sulfonic acid and its salts and more especially to the preparation of alkaline earth salts of thiophene sulfonic acid and other salts readily derived from the alkaline earth thiophene sulfonates.

Prior to our invention it has been suggested by Steinkopf and co-workers (Ann. 437, 17 (1924); 501, 174 (1933)) that thiophene sulfonic acid could be prepared by sulfonation of thiophene with sulfuric acid. Our attempts, however, to duplicate his results have been unsuccessful, and we have reached the conclusion that sulfonation of thiophene with sulfuric acid is not a satisfactory method of producing this compound.

We have now discovered an improved process for the production of thiophene sulfonic acid and salts thereof comprising sulfonating thiophene with fluosulfonic acid whereby to produce a mixture of thiophene sulfonyl fluoride and thiophene sulfonic acid and reacting the resulting mixture with an alkaline earth hydroxide, whereby to form from both the thiophene sulfonic acid and the thiophene sulfonyl fluoride the alkaline earth thiophene sulfonate. The alkaline earth thiophene sulfonate can be readily converted into thiophene sulfonic acid and other thiophene sulfonates by treatment thereof with soluble sulfates such as for example $H_2SO_4$, $NiSO_4$ and the like. The reaction between thiophene and fluosulfonic acid may be indicated as follows:

$2C_4H_4S + 2FSO_3H \rightarrow$
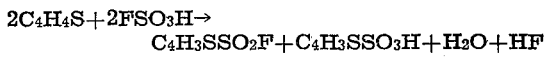
$C_4H_3SSO_2F + C_4H_3SSO_3H + H_2O + HF$ The relative proportion of thiophene sulfonic acid and thiophene sulfonyl fluoride resulting from this reaction may vary according to the conditions of the reaction, but in our experience considerably more thiophene sulfonyl fluoride is produced than thiophene sulfonic acid. This circumstance, however, is of little importance in view of the fact that upon treatment of a mixture of thiophene sulfonyl fluoride and thiophene sulfonic acid with alkaline earth hydroxide, both compounds react to form alkaline earth thiophene sulfonate as shown by the following reactions:

$2C_4H_3SSO_2F + 2Ba(OH)_2 \rightarrow$
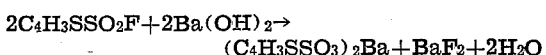
$(C_4H_3SSO_3)_2Ba + BaF_2 + 2H_2O$ $2C_4H_3SO_3H + Ba(OH)_2 \rightarrow (C_4H_3SSO_3)_2Ba + 2H_2O$
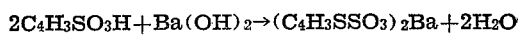

It will be noted that the by-products of the reaction are $BaF_2$, which is insoluble, and $H_2O$ which is the medium in which the reaction is carried out. In the event there is present unreacted fluosulfonic acid, it will react with barium hydroxide to form insoluble products as indicated in the following reaction:

$2FSO_3H + 3Ba(OH)_2 \rightarrow BaF_2 + 2BaSO_4 + 4H_2O$
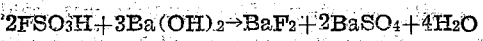

Having produced the barium salt or other alkaline earth salt it is relatively easy to produce numerous other salts as well as the sulfonic acid by treating the barium or other alkaline earth salt with a soluble sulfate as indicated by the following reactions:

$(C_4H_3SSO_3)_2Ba + NiSO_4 \rightarrow (C_4H_3SSO_3)_2Ni + BaSO_4$
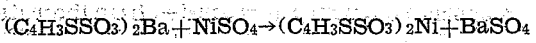

$(C_4H_3SSO_3)_2Ba + H_2SO_4 \rightarrow 2C_4H_3SSO_3H + BaSO_4$
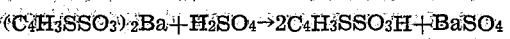

Of the three alkaline earth thiophene sulfonates, we prefer the barium salt on account of the exceedingly low solubility of barium sulfate and barium fluoride and the ready availability of barium hydroxide. Calcium sulfate is somewhat more soluble than barium sulfate and accordingly we prefer to use barium hydroxide in spite of the fact that lime is somewhat cheaper. Strontium sulfate is somewhat more soluble than barium sulfate and at the same time strontium compounds cost more than barium compounds. Accordingly, we prefer to employ barium hydroxide although the other alkaline earths, calcium and strontium can be used.

In carrying out the above reactions, we bring together slowly and with agitation thiophene and a substantial excess of fluosulfonic acid, preferably from 2 to 5 mols of fluosulfonic acid for each mol of thiophene. This mixture is held at a temperature below normal room temperature, preferably between −5° C. and +10° C. for a considerable period of time, preferably adding the fluosulfonic acid over a period of about two hours and then continuing to agitate the mixture for from 2 to 5 hours more. After the sulfonation has been carried on for a sufficient length of time, we prefer to add to the reaction mixture a large excess of water and then a sufficient amount of barium hydroxide to produce an alkaline reaction, preferably about pH 8 to 10 and heating the mixture to 80–100° C. for 2 hours. From the barium thiophene sulfonate thus obtained a great variety of thiophene sulfonates as well as thiophene sulfonic acid can be obtained by reaction with the soluble sulfate of the element which is to replace barium. By treating the barium salt with sulfuric acid or any one of various soluble metal sulfates such as nickel, cobalt, copper, iron manganese, silver, tin, chromium, aluminum and ammonium, in aqueous solution, the corresponding thiophene sulfonate is obtained together with the highly insoluble barium sulfate which is readily removed by filtration or decantation.

By the above indicated method, we have obtained yields of the order of 45% of theoretical and of very good purity. For example, in one batch of nickel thiophene sulfonate, analysis showed 1.65% barium ion, 0.10% sulfate ion, 0.72% fluoride ion and only a trace of fluosulfonate ion.

The following example from the actual practice will serve to illustrate the invention:

Example 84 grams of thiophene were mixed with 300 grams of fluosulfonic acid over a two hour period, and the mixture was agitated at a temperature held between 5° C. and 10° C. for a further period of 2 hours at atmospheric pressure. No water was added to the reaction mixture up to this time. At the end of this sulfonation period, there was added to the reaction mixture 2,000 grams of water and 1150 grams of barium hydroxide crystals with agitation. The mixture was held at 90° C. for approximately 2 hours. The insoluble barium salt ($BaF_2$, $BaSO_4$ and probably some $Ba(FSO_3)_2$) precipitate was removed by filtration. There was then added to the barium thiophene sulfonate 100 grams of nickel sulfate with agitation and the resulting barium sulfate precipitate was removed by filtration. The resulting nickel thiophene sulfonate was separated from the water in the reaction mixture by vacuum drying. The yield of bright green crystals of nickel thiophene sulfonate was 85 grams. (Theoretical yield, 192 grams.)

Having thus described our invention, what we claim is:

1. A process for the preparation of alkaline earth metal salts of thiophene sulfonic acid including the steps of contacting thiophene with fluosulfonic acid whereby to produce a mixture of thiophene sulfonyl fluoride and thiophene sulfonic acid and contacting the resulting mixture of said compounds in aqueous solution with an alkaline earth hydroxide whereby to convert both said compounds to an alkaline earth salt of thiophene sulfonic acid and to precipitate an alkaline earth fluoride.

2. A process comprising contacting thiophene with fluosulfonic acid at a temperature from minus 5° C. to plus 10° C. and for a time from 4 to 7 hours and then contacting the reaction mixture in aqueous solution with $Ba(OH)_2$ in amount sufficiently in excess of the stoichiometric equivalent of the thiophene sulfonyl fluoride, the thiophene sulfonic acid and any unreacted fluosulfonic acid to produce an alkaline solution containing barium thiophene sulfonate and to precipitate barium fluoride.

HAROLD S. HALBEDEL.
JAMES C. HEATH.

REFERENCES CITED

The following references are of record in the file of this patent:

Morton, "The Chemistry of Heterocyclic Compounds," pages 44 and 45, McGraw-Hill, N. Y., 1946.

Groggins, "Unit Processes in Organic Synthesis," pages 258, 259, McGraw-Hill, N. Y., 1938.

"Organic Reactions," vol. III, 1946, John Wiley, pages 147, 164.

Steinkopf, J. Prakt. Chem. 117, 3–4 (1927).